(12) United States Patent
Chang et al.

(10) Patent No.: US 10,378,427 B2
(45) Date of Patent: Aug. 13, 2019

(54) NITROGEN ENRICHED AIR SUPPLY FOR GASOLINE COMPRESSION IGNITION COMBUSTION

(71) Applicant: Saudi Arabian Oil Company, Dhahran (SA)

(72) Inventors: Junseok Chang, Dhahran (SA); Jaeheon Sim, Dhahran (SA); Seung-Hak Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 42 days.

(21) Appl. No.: 15/475,383

(22) Filed: Mar. 31, 2017

(65) Prior Publication Data

US 2018/0283262 A1  Oct. 4, 2018

(51) Int. Cl.
*F02B 3/08* (2006.01)
*F02B 11/02* (2006.01)
(Continued)

(52) U.S. Cl.
CPC ............... *F02B 11/02* (2013.01); *B60K 13/02* (2013.01); *F02B 3/08* (2013.01); *F02B 11/00* (2013.01);
(Continued)

(58) Field of Classification Search
CPC ......... F02B 11/02; F02B 75/10; F02M 26/14; F02M 25/00; F02M 25/10; F02M 25/12;
(Continued)

(56) References Cited

U.S. PATENT DOCUMENTS 3,985,108 A  10/1976  Matsumoto et al.
4,212,276 A   7/1980  Kaneda
(Continued)

FOREIGN PATENT DOCUMENTS

CN    102399602 A    4/2012
CN    202226834 U    5/2012
(Continued)

OTHER PUBLICATIONS

Setty, Varadaraja, B.E., "The Effect of Oxygen-Enriched Air on the Performance and Exhaust Emissions of Internal Combution Engines", A Thesis submitted to the Graduate Faculty of Texas Tech University; May 1993.
(Continued)

*Primary Examiner* — Lindsay M Low
*Assistant Examiner* — Yi-Kai Wang
(74) *Attorney, Agent, or Firm* — Dinsmore & Shohl, LLP

(57) ABSTRACT

A gasoline compression ignition engine, a vehicle and a method of operating a gasoline compression ignition engine. An inlet air management system includes a membrane-based separator and an exhaust gas recirculation flowpath that cooperate to deliver a nitrogen enriched air stream to the engine to help reduce exhaust gas emissions. The separator segregates the incoming air into the nitrogen enriched air stream as well as an oxygen enriched air stream such that the latter can be used for various engine load conditions, as well as for supplemental air for a cabin or related passenger compartment within a vehicle that is powered by the engine. Significantly, during an increase in engine load not associated with the cold start and warm-up conditions, the nitrogen enriched air supply that is used for the exhaust gas emissions reduction is provided at least partially by the nitrogen enriched air stream from the separator, as well as increas-
(Continued)

US 10,378,427 B2

Page 2 ingly by the nitrogen enriched combustion product stream from the exhaust gas recirculation flowpath.

23 Claims, 5 Drawing Sheets

(51) Int. Cl.
| | | |
|---|---|---|
| F02M 35/10 | (2006.01) | |
| F02M 26/14 | (2016.01) | |
| F02D 41/00 | (2006.01) | |
| F02B 75/10 | (2006.01) | |
| F02D 43/04 | (2006.01) | |
| F02D 41/06 | (2006.01) | |
| B60K 13/02 | (2006.01) | |
| F02D 41/30 | (2006.01) | |
| F02M 25/00 | (2006.01) | |
| F02M 25/10 | (2006.01) | |
| F02M 25/12 | (2006.01) | |
| F02M 27/00 | (2006.01) | |
| F02B 11/00 | (2006.01) | |

(52) U.S. Cl.
CPC .......... *F02B 75/10* (2013.01); *F02D 41/0002* (2013.01); *F02D 41/005* (2013.01); *F02D 41/0047* (2013.01); *F02D 41/062* (2013.01); *F02D 41/064* (2013.01); *F02D 41/068* (2013.01); *F02D 41/3017* (2013.01); *F02D 43/04* (2013.01); *F02M 25/00* (2013.01); *F02M 25/10* (2013.01); *F02M 25/12* (2013.01); *F02M 26/14* (2016.02); *F02M 27/00* (2013.01); *F02M 35/10301* (2013.01); *F02D 2041/3052* (2013.01); *F02D 2250/36* (2013.01); *Y02T 10/47* (2013.01)

(58) Field of Classification Search
CPC .............. F02M 35/10301; B60K 13/02; F02D 41/0002; F02D 41/0047; F02D 41/005; F02D 41/062; F02D 41/064; F02D 41/068; F02D 41/3017; F02D 43/04; F02D 2041/3052; F02D 2250/36; F20M 27/00
USPC ........................................................ 123/585
See application file for complete search history.

(56) References Cited

U.S. PATENT DOCUMENTS

| | | | |
|---|---|---|---|
| 4,308,841 A | 1/1982 | Kingsley | |
| 4,963,745 A | 10/1990 | Maggard | |
| 5,018,645 A | 5/1991 | Zinsmeyer | |
| 5,132,486 A | 7/1992 | Wylie | |
| 5,357,908 A | 10/1994 | Sung et al. | |
| 5,649,517 A * | 7/1997 | Poola ................... | B01J 19/088 |
| | | | 123/585 |
| 5,794,601 A | 8/1998 | Pantone | |
| 5,979,705 A | 11/1999 | Kaehler et al. | |
| 6,055,808 A | 5/2000 | Poola et al. | |
| 6,067,973 A | 5/2000 | Chanda et al. | |
| 6,112,134 A | 8/2000 | Terranova et al. | |
| 6,119,637 A | 9/2000 | Matthews et al. | |
| 6,161,060 A | 12/2000 | Collins | |
| 6,163,738 A | 12/2000 | Miller | |
| 6,173,567 B1 | 1/2001 | Poola et al. | |
| 6,230,693 B1 | 5/2001 | Meiller et al. | |
| 6,332,448 B1 | 12/2001 | Ilyama et al. | |
| 6,352,068 B1 | 3/2002 | Jacobsen | |
| 6,380,859 B1 * | 4/2002 | Brownlee ............ | B60H 3/0007 |
| | | | 180/272 |
| 6,422,465 B2 | 7/2002 | Miller | |
| 6,494,192 B1 | 12/2002 | Capshaw et al. | |
| 6,505,134 B2 | 1/2003 | Poleshuk et al. | |
| 6,742,507 B2 | 6/2004 | Keefer et al. | |
| 6,972,093 B2 | 12/2005 | Partridge et al. | |
| 7,032,629 B1 | 4/2006 | Mattingly et al. | |
| 7,100,543 B2 | 9/2006 | Davidson | |
| 7,370,610 B2 | 5/2008 | Ashford et al. | |
| 7,377,272 B2 | 5/2008 | Davidson | |
| 7,455,046 B2 | 11/2008 | Biruduganti et al. | |
| 7,459,592 B2 | 12/2008 | Wolf et al. | |
| 7,523,770 B2 | 4/2009 | Horowitz et al. | |
| 7,900,607 B2 | 3/2011 | Lang et al. | |
| 7,954,478 B1 | 6/2011 | Schechter | |
| 7,958,872 B1 | 6/2011 | Schechter | |
| 8,046,984 B1 | 11/2011 | Schechter | |
| 8,051,828 B2 | 11/2011 | Sengupta et al. | |
| 8,118,009 B2 | 2/2012 | Pursifull et al. | |
| 8,141,356 B2 | 3/2012 | Leone et al. | |
| 8,211,300 B2 | 7/2012 | Partridge et al. | |
| 8,258,363 B2 | 9/2012 | Kalakkunnath et al. | |
| 8,375,899 B2 | 2/2013 | Leone et al. | |
| 8,580,111 B2 | 11/2013 | Partridge et al. | |
| 8,656,869 B2 | 2/2014 | Leone et al. | |
| 8,991,358 B2 | 3/2015 | Gehrke | |
| 9,422,147 B2 | 8/2016 | Bartlett et al. | |
| 9,776,624 B1 * | 10/2017 | Leone ................... | B60W 20/14 |
| 2002/0152999 A1 | 10/2002 | Holder et al. | |
| 2004/0065076 A1 | 4/2004 | Katoh et al. | |
| 2005/0055874 A1 | 3/2005 | Bekemeyer | |
| 2005/0056264 A1 | 3/2005 | Weissman et al. | |
| 2005/0066576 A1 | 3/2005 | Morris et al. | |
| 2005/0222748 A1 * | 10/2005 | Naik ................... | F02D 41/0275 |
| | | | 701/103 |
| 2006/0009670 A1 | 1/2006 | Briot et al. | |
| 2006/0037589 A1 | 2/2006 | Gupta et al. | |
| 2007/0107676 A1 | 5/2007 | Davidson | |
| 2007/0256665 A1 * | 11/2007 | Sun ....................... | F02D 19/081 |
| | | | 123/431 |
| 2008/0041226 A1 | 2/2008 | Hiltzik et al. | |
| 2008/0098985 A1 | 5/2008 | Kamio | |
| 2008/0196695 A1 * | 8/2008 | Storhok ................ | F02D 41/064 |
| | | | 123/478 |
| 2008/0202118 A1 * | 8/2008 | Ide ....................... | F02D 41/0052 |
| | | | 60/605.2 |
| 2008/0308073 A1 | 12/2008 | Allen et al. | |
| 2008/0308074 A1 | 12/2008 | Allen et al. | |
| 2008/0308075 A1 | 12/2008 | Allen et al. | |
| 2009/0165759 A1 | 7/2009 | Sengupta et al. | |
| 2009/0255875 A1 | 10/2009 | Unger et al. | |
| 2011/0023841 A1 * | 2/2011 | Ucke ..................... | F02M 25/10 |
| | | | 123/568.12 |
| 2012/0006504 A1 | 1/2012 | Sugiura | |
| 2012/0031812 A1 | 2/2012 | Paggi | |
| 2012/0192834 A1 * | 8/2012 | Tonery .................. | F02B 37/162 |
| | | | 123/434 |
| 2013/0014731 A1 | 1/2013 | Pursifull et al. | |
| 2013/0168311 A1 | 7/2013 | Johnson et al. | |
| 2013/0213349 A1 | 8/2013 | Sellnau et al. | |
| 2013/0255493 A1 | 10/2013 | Gupta | |
| 2013/0269521 A1 | 10/2013 | Nishita et al. | |
| 2015/0114362 A1 | 4/2015 | Costa-Patry et al. | |
| 2015/0353853 A1 | 12/2015 | Iwashita et al. | |
| 2016/0076492 A1 | 3/2016 | Leone et al. | |
| 2016/0265493 A1 * | 9/2016 | Bima ................. | F02M 35/10242 |
| 2016/0313171 A1 | 10/2016 | Dudar et al. | |
| 2016/0368373 A1 | 12/2016 | Dudar et al. | |
| 2017/0122668 A1 * | 5/2017 | Fujii ..................... | F28D 9/0056 |
| 2017/0211532 A1 | 7/2017 | Yamauchi et al. | |
| 2017/0234276 A1 | 8/2017 | Hamad et al. | |
| 2017/0246614 A1 | 8/2017 | Eddaoudi et al. | |
| 2017/0282708 A1 | 10/2017 | Hamad et al. | |

FOREIGN PATENT DOCUMENTS

| | | |
|---|---|---|
| CN | 103045285 A | 4/2013 |
| DE | 102004049218 A1 | 4/2006 |
| EP | 1057988 A2 | 12/2000 |
| EP | 1832738 A2 | 9/2007 |

(56) References Cited

FOREIGN PATENT DOCUMENTS

| | | |
|---|---|---|
| JP | 2004231296 A | 8/2004 |
| JP | 2004277016 A | 10/2004 |
| JP | 2010163901 A | 7/2010 |
| WO | 2011007121 A2 | 1/2011 |
| WO | 2017014976 A1 | 1/2017 |

OTHER PUBLICATIONS

"Different Strokes Infiniti Articulates Its Case for Variable Compression" www.roadandtrack.com Published: Feb. 2017.

International Search Report and Written Opinion dated Jan. 18, 2019 pertaining to International application No. PCT/US2018/052339 filed Sep. 24, 2018.

International Search Report and Written Opinion pertaining to International Application PCT/US2018/054182, Dec. 19, 2018, 14 pages.

U.S. Office Action pertaining to U.S. Appl. No. 15/885,084 dated Jan. 2, 2019, 20 pages.

International Search Report and Written Opinion pertaining to International Application PCT/US2018/023962 dated Aug. 6, 2018.

International Search Report and Written Opinion dated May 6, 2019 pertaining to International application No. PCT/US2019/015330 dated Jan. 28, 2019.

Notice of Allowance dated Apr. 11, 2019 pertaining to Application No. 15/885,084 filed Jan. 31, 2018, 13 pgs.

Notice of Allowance dated May 1, 2019 pertaining to U.S. Appl. No. 15/939,971 filed Mar. 29, 2018, 32 pgs.

Notice of Allowance dated May 13, 2019 pertaining to U.S. Appl. No. 15/939,930 filed Mar. 29, 2018, 32 pgs.

International Search Report and Written Opinion dated May 15, 2019 pertaining to International application No. PCT/US2019/015349 filed Jan. 28, 2019, 13 pgs.

\* cited by examiner

NITROGEN ENRICHED AIR SUPPLY FOR GASOLINE COMPRESSION IGNITION COMBUSTION

The present disclosure relates generally to a way to improve internal combustion engine operability and more particularly to the use of generating nitrogen enriched combustion air from multiple sources for use in a compression ignition engine that uses gasoline as a fuel source.

BACKGROUND

Within the realm of internal combustion engines (ICEs) used for vehicular propulsion, the spark ignition (SI) engine and the compression ignition (CI) engine are the ones most commonly in use. In SI engines, a mixture of air and fuel (typically gasoline) is introduced into a cylindrical combustion chamber for ignition via spark plug. As the resulting flame front propagates through the combustion chamber from the initial ignition point, the temperature continues to rise, which in turn leads to high peak combustion temperatures. Common emissions from the SI process include (among others) carbon monoxide (CO), unburned hydrocarbons and nitrogen oxides (NOx). Modern SI engine vehicles typically employ a three-way catalytic converter for reduction of each of these combustion byproducts. In order to ensure that the catalysts operate at peak performance with regard to NOx reduction, such engines are operated at or near stoichiometric fuel-to-air ratios as a way to avoid the presence of catalyst-impairing excess oxygen ($O_2$) in the exhaust gas.

In CI engines, fuel (typically diesel fuel) is introduced into the combustion chamber where the air is already present in a highly compressed form. The elevated temperature within the chamber that accompanies the increased pressure causes the fuel to auto-ignite. The combustion process follows via mixing of fuel/air through diffusion. Unlike typical SI engines, the direct fuel injection of CI engines eliminates throttle losses and associated fuel pumping losses. The high compression ratio and inherent lean burn of CI engine with less pumping loss result in higher thermodynamic efficiency than that of SI engine. However, the excess $O_2$ associated with such lean fuel-to-air ratios makes the use of the SI engine's three way catalyst impractical for NOx reduction, as such catalysts only operate effectively over a very narrow range (typically between about 0.5% and 1.0%) of $O_2$ levels. To overcome this limitation, complicated and expensive fuel injection and after-treatment system are included. Examples of known after-treatment approaches include a lean NOx trap, selective catalytic reduction (SCR) and Exhaust Gas Recirculation (EGR). While useful for their intended purpose, excessive reliance on these approaches can be counterproductive, as lean NOx traps and SCR require periodic regeneration, while the effectiveness of EGR is limited at high engine power levels.

Another engine type, known as the homogeneous charge compression ignition (HCCI) engine, attempts to combine features of both diesel-based CI engines and gasoline-based SI engines. In an HCCI engine, the fuel and air is mixed prior to introduction to the combustion chamber in a manner generally similar to traditional SI engines. Like traditional CI engines, combustion is achieved through auto-ignition of the mixture at certain temperature and pressure conditions within the combustion chamber. Under ideal conditions, an HCCI engine achieves a diffuse, flameless combustion along with lower peak pressure and temperature; such combustion is effective in keeping NOx production low. In reality, however, it has proven extremely difficult to establish precise control over attaining the correct combination of temperature, pressure and composition of the fuel-air mixture over a wide range of engine operating conditions, particularly as it relates to high power output conditions.

Still another engine type, known as the gasoline compression ignition (GCI) engine (also referred to as the partially premixed compression ignition (PPCI) engine), has received attention as an attractive alternative to traditional diesel CI or gasoline SI engines. In a GCI engine, the fuel is injected in a staged manner late in the compression phase of the engine's four-stroke cycle operation. In this way, the fuel charge may be thought of as having both locally stoichiometric and globally stratified properties. Significantly, gasoline in general (and low-octane gasoline in particular) has a higher volatility and longer ignition delay relative to diesel fuel. By introducing such a fuel relatively late in the compression stroke and taking advantage of the fuel's ignition delay (which helps to promote additional fuel-air mixing), combustion does not commence before the end of the injection. To achieve a desirable degree of stratification, multiple injections may be used. By operating under low temperature combustion (LTC) conditions, GCI engines can have significantly reduced NOx production and soot emissions while achieving diesel-like thermal efficiencies. Moreover, refining low-octane gasoline is easier (and less expensive) than processing conventional gasoline and diesel fuels, which in turn reduces the entire well-to-tank emissions of other undesirable substances, such as $CO_2$.

One shortcoming with a GCI engine is that the NOx emission that is low during normal engine operating conditions tends to increase under heavy loads. As such, automobile manufacturers have implemented some of the various techniques mentioned above (i.e., SCR, EGR, etc.) as a way to ensure NOx compliance under all engine operating conditions. Such corrective measures are expensive and, as mentioned above, can limit engine performance. For example, excessive EGR can lead to combustion instability and associated misfiring, as well as contribute to valve clogging from the carbon deposits that are contained in the recirculated exhaust gas. The excessive reliance on EGR also makes it difficult to control GCI engine transient responses, as the reduction of the intake air charge density may be incompatible with maintaining a continuous combustion flame front within the combustion chamber.

SUMMARY

According to one embodiment of the present disclosure, a GCI engine with a nitrogen ($N_2$) enriched air supply for exhaust gas emissions reduction is disclosed. The GCI engine includes numerous combustion chambers, an air inlet in selective fluid communication with each of the combustion chambers, an exhaust gas outlet in selective fluid communication with each of the combustion chambers and an inlet air management system that can prioritize the preparation of a nitrogen enriched air charge. The inlet air management system includes a membrane-based separator, an EGR flowpath, a flow control conduit and a combustion air enrichment controller. The separator is in fluid communication with the air inlet such that air introduced to the separator is split into an oxygen enriched air (OEA) stream and a nitrogen enriched air (NEA) stream. Likewise, the exhaust gas recirculation flowpath is in fluid communication with the exhaust gas outlet to convey a nitrogen enriched combustion product stream that forms when a mixture of air and gasoline is ignited within the combustion chamber. In addition, the flow control conduit is cooperative with the separator and the exhaust gas recirculation flowpath such that one or both of the nitrogen enriched combustion product stream from the exhaust gas recirculation flowpath and the nitrogen enriched air stream from the separator are placed in selective fluid communication with the air inlet. Numerous sensors are used to acquire engine operating parameters. The controller is in signal communication with the sensors such that they—along with the separator, exhaust gas recirculation flowpath and flow control conduit—cooperate to deliver to the air inlet (a) the oxygen enriched air stream from the separator during a cold start and warm-up load on the GCI engine and (b) the nitrogen enriched air stream from the separator and the nitrogen enriched combustion product stream from the exhaust gas recirculation flowpath. Significantly, during an increase in engine load not associated with the cold start and warm-up load, the controller provides an instruction set where the nitrogen enriched air supply that is used for the exhaust gas emissions reduction is provided at least partially by the nitrogen enriched air stream from the separator, as well as increasingly by the nitrogen enriched combustion product stream from the exhaust gas recirculation flowpath.

Within the present context, the various engine operating loads or conditions (for example, low, normal, cold start and high) may correspond to various regimes that may be monitored and operated upon by the controller to ensure that proper management of the air mixture. In a similar manner, the controller—either alone or working in conjunction with another controller—may be used to ensure that proper fuel and associated environmental operating conditions for such modes are being followed.

By way of example, the disclosed GCI engine using an unleaded regular gasoline with a research octane number (RON) of 91 may experience a relatively long ignition delay for one or more of the various operating conditions: low engine loads; low ambient temperatures and cold start (as well as its attendant early warm-up). In such circumstances, auto-ignition may be too weak, too late or fail altogether. To avoid such conditions, the controller may work with other conduit, valves and a spark plug such that injected fuel starts ignition and combustion on time. In case of SI operation, the OEA stream helps increasing flame speed and combustion rate especially when the cylinder temperature is low. Likewise, for medium-to-high-load operation, cylinder pressure and temperatures are increased; such operating conditions tend to promote early auto-ignition and may lead to higher NOx emissions and higher combustion noise.

According to another embodiment of the present disclosure, a vehicle is disclosed. The vehicle includes a platform comprising a wheeled chassis, a guidance apparatus cooperative with the wheeled chassis and a passenger compartment and a GCI engine coupled to the platform to deliver motive power. The GCI engine includes numerous combustion chambers, an air inlet, an exhaust gas outlet and an inlet air management system that includes a membrane-based separator, an EGR flowpath, a flow control conduit, numerous sensors and a combustion air enrichment controller. Both the air inlet and the exhaust gas outlet are in selective—fluid communication with each of the combustion chambers. Air introduced to the separator is split into at least an OEA stream and an NEA stream, while the EGR flowpath is used to convey a nitrogen enriched combustion product stream back into the air inlet. The flow control conduit is used to route the nitrogen enriched air supply among the various components.

The various components of the inlet air management system cooperate to deliver to the air inlet OEA and NEA streams. In particular, the OEA stream is carried from the separator during a cold start and warm-up load on the GCI engine, while the NEA stream is carried from both the separator and the EGR flowpath during periods not associated with the cold start and warm-up loads. Moreover, during these periods not associated with the cold start and warm-up loads, the controller provides an instruction set where varying portions of the exhaust gas emissions reduction is provided by the nitrogen enriched combustion product stream from the EGR flowpath and the NEA air stream from the separator.

According to yet another embodiment of the present disclosure, a method of operating a GCI engine is disclosed. The method includes introducing a gasoline-based fuel to engine combustion chambers and using an inlet air management system to—among other things—help reduce exhaust gas emissions. The inlet air management system includes a membrane-based separator, an exhaust gas recirculation flowpath, flow control conduit cooperative with the separator and the exhaust gas recirculation flowpath, numerous sensors and a combustion air enrichment controller in signal communication with the sensors and the flow control conduit. In use, air introduced into a membrane-based separator for separation into at least an OEA stream and an NEA stream is manipulated by the inlet air management system so that at least a portion of the NEA stream, as well as (depending on the engine load) the nitrogen enriched combustion product stream from the exhaust gas recirculation flowpath, is provided to the engine as a way to adjust the rate at which GCI combustion takes place within the engine. In this way, during an increase in engine load not associated with cold start or warm-up operating conditions, the nitrogen enriched air supply that is used for the exhaust gas emissions reduction is provided at least partially by the nitrogen enriched air stream from the separator and in certain circumstances from the nitrogen enriched combustion product stream that is present in the exhaust gas recirculation flowpath.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to a method and system for improving engine performance and reducing NOx emissions of a GCI engine through intake air control that uses the combined contributions of a membrane and EGR in order to selectively deliver a nitrogen-containing charge to the engine's combustion chambers. While it is generally known to have each of these components operate independently of one another, the authors of the present disclosure take the position that by integrating the two, improvements in overall engine performance may be realized, as well as reduced size, weight or complexity of a resulting air supply system. In particular, under the present disclosure, the incoming air supply is routed through the membrane to separate the input air stream into the OEA stream and NEA stream. The NEA stream is fed to the engine air intake in order to dilute the intake charge and decrease GCI combustion rate, which in turn reduces NOx emission in a manner generally similar to a conventional EGR. Likewise, in operating conditions (such as cold start) where GCI may not be possible, the OEA increases the flame propagation combustion rate for quicker warm-up and related engine operability improvements. In an optional form, the excessive OEA can also be fed into the vehicle's passenger compartment to refresh cabin air (that is to say, passenger compartment) quality. The EGR may be used to also dilute the intake charge, and in so doing, can help reduce the size of the membrane to help with its packaging within a vehicular environment. This EGR use is particularly beneficial in high load conditions as a way to supplement the NOx-reducing performance of the NEA that comes from the membrane. By relying at least in part on the membrane for additional $N_2$ over numerous GCI engine operating conditions, the reliance on the EGR request may be reduced, which in turn may lead to improvements in GCI transient control response, as well as increased high load limits of the GCI engine.

Figure 1:
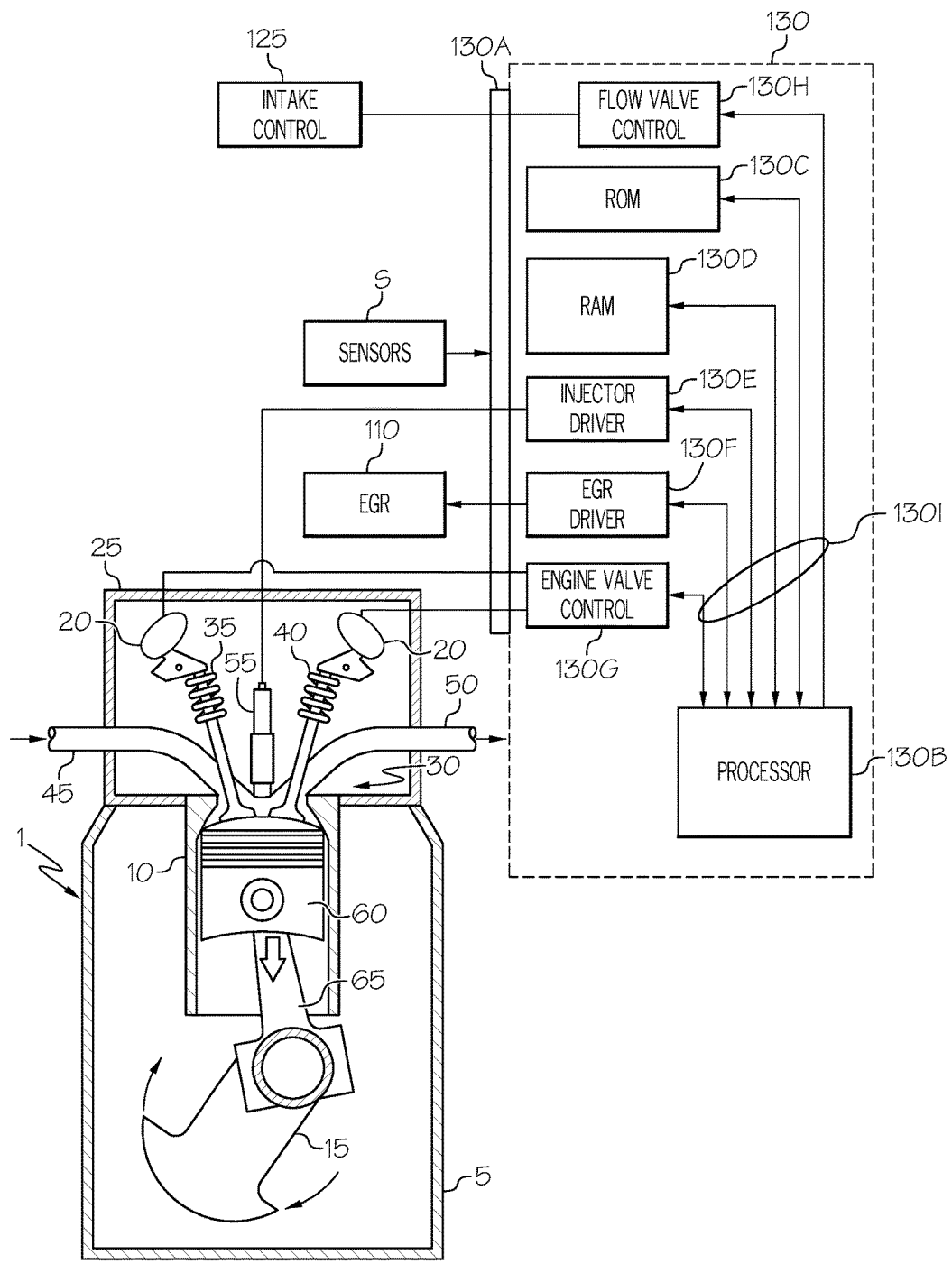
FIG. 1 shows a simplified cutaway view of a GCI engine and a portion of an inlet air management system in accordance with one or more embodiments shown or described herein.
Figure 2:
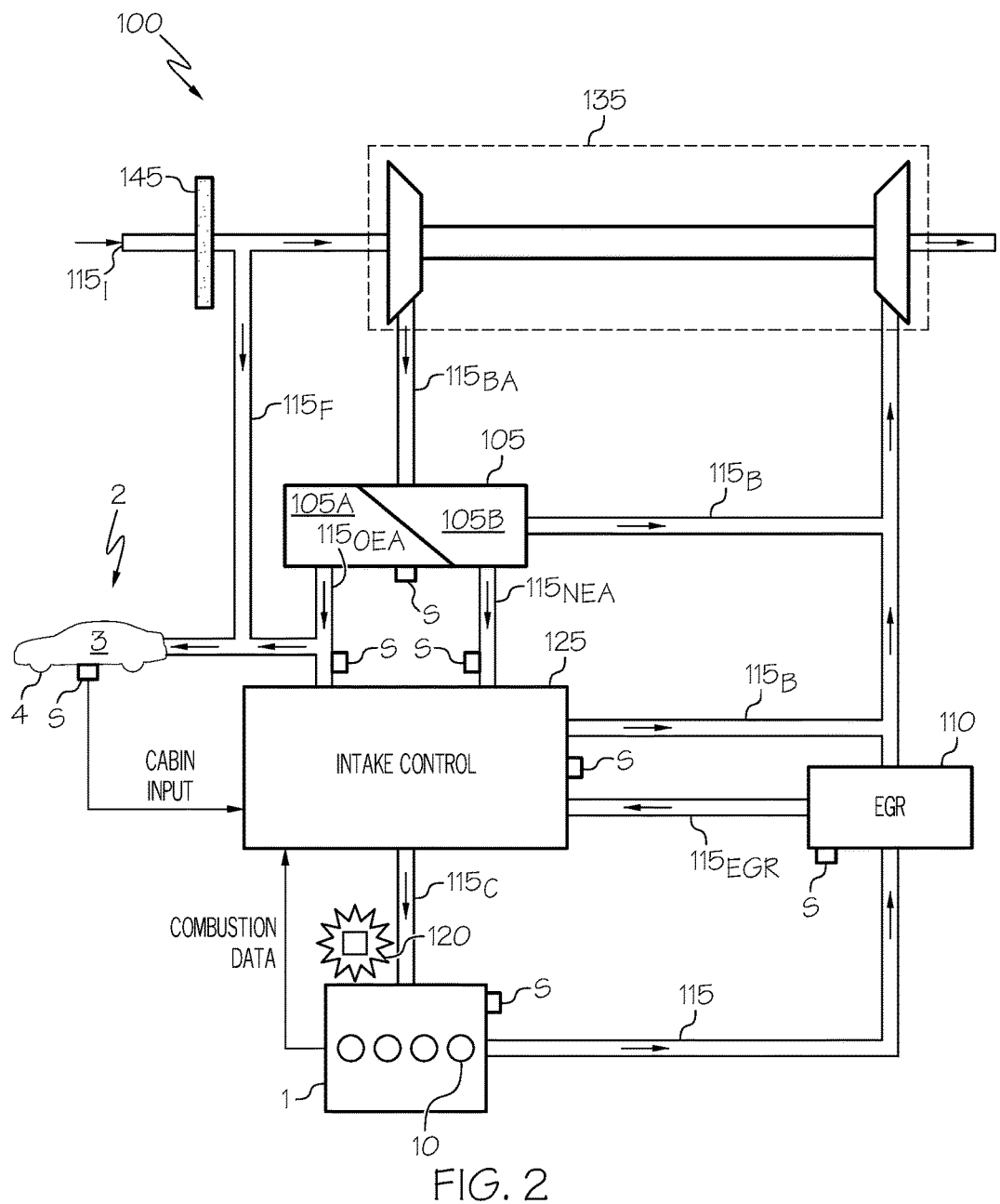
FIG. 2 illustrates a simplified view of various flowpaths associated with the air management system in accordance with one or more embodiments shown or described herein.

Referring first to FIGS. 1 and 2, a diagrammatic illustration of a GCI engine 1 with a nitrogen enriched air supply for use in a vehicle 2 with a passenger compartment 3 that is placed upon a wheeled chassis 4 is shown. The engine 1 includes an engine block 5 with numerous cylinders 10, a crankshaft 15 rotatably movable within the block 5, numerous cams 20 responsive to movement of the crankshaft 15, a head 25 coupled to the engine block 5 to define numerous combustion chambers 30. The head 25 includes inlet valves 35 and exhaust valves 40 (only one of each is shown) that in one form may be spring-biased to move in response to the crankshaft 15 through a corresponding one of the cams 20 that are controlled by either a crankshaft-driven chain, crankshaft-actuated pushrods or pneumatic actuators (none of which are shown). An air inlet 45 (which may be part of combustor inlet gas $115_c$ that is fluidly coupled to portions of the flow control conduit 115 and intake control 125 that are discussed in more detail in subsequent paragraphs) and an exhaust gas outlet 50 are in selective fluid communication with each of the combustion chambers 30 through a fuel injector 55, while a piston 60 is received in each respective cylinder 10 and coupled to the crankshaft 15 through a connecting rod 65 so that the reciprocating movement of the piston 60 in response to a compression ignition combustion taking place within the combustion chamber 30 is converted by the pivoting movement of the connecting rod 65 and crankshaft 15 to rotational movement of the crankshaft 15 for subsequent power delivery to the remainder of a powertrain that is made up of the engine 1 and transmission, axles, differentials and wheels (none of which are shown). The combustion associated with the GCI engine 1 can be categorized as having partially premixed compression ignition (PPCI) attributes in that the timing of the auto-ignition combustion is controlled by manipulating fuel/air ratio levels within the combustion chamber during portions of the compression stroke.

The supply of air that is used for the combustion process achieves its nitrogen enrichment with an inlet air management system 100. This system 100 includes a membrane-based separator 105 and an EGR 110, along with suitable conduit 115 so that air used for the combustion, as well as exhaust gas that is a product of such combustion, may be used to dilute an air intake charge of the engine 1 in order to selectively decrease GCI combustion rate, which in turn leads to a reduction in NOx emission. Within the present context, the flow control conduit 115 includes not just the pipes, tubes, channels or related fluid-conveying lines, but also any valves (not shown) or related flow control devices that are fluidly disposed in such lines. By using the separator 105, reliance on the EGR 110 may be reduced, especially for certain engine loads. In other engine operating loads or conditions such as cold starts and associated warm-ups, the separator 105 may be used with a spark ignition device 120 (such as a spark plug) to increase the flame propagation combustion rate. Within the present context, the other operating conditions that are not associated with the cold start or warm-up conditions can be run under the GCI mode of operation discussed herein.

As shown, an inlet (that is to say, a feed stream) $115_I$ of ambient air forms a portion of the flow control conduit 115 and is used to first introduce the air to the separator 105 where an $O_2$-rich permeate flows through OEA stream $115_{OEA}$ and an $N_2$-rich retentate 105B flows through NEA stream $115_{NEA}$. Both OEA and NEA streams $115_{OEA}$, $115_{NEA}$ are fed to intake control 125 that is in the form of a mixing chamber or the like. In one form, the EGR 110 is in the form of a valve so that it along with the associated portions of flow control conduit 115 form an EGR flowpath $115_{EGR}$ that recirculates the exhausted gas that leaves the combustion chamber 30 through exhaust valve 40 into the intake control 125. The intake control 125—in response to control signals from a processor-based controller 130 that is discussed in more detail below that is used to adjust valve and bypass flows in various parts of flow control conduit 115—modulates the performance of separator 105 with feed flow rate and feed/permeate pressure in order to adjust the amount of each gas stream from the three inputs (that is to say, the OEA stream $115_{OEA}$, the NEA stream $115_{NEA}$ and the EGR stream $115_{EGR}$) according to the required engine 1 load or related operational conditions. During cold start condition, the OEA stream $115_{OEA}$ can be supplied solely to increase the combustion rate; in such cases, no NEA stream $115_{NEA}$ is introduced into the combustion chambers 30. In other operating conditions, the NEA stream $115_{NEA}$ is supplied for reducing NOx emissions. At high engine load conditions (such as those associated with elevated mean effective pressure (MEP)) as discussed herein, the EGR stream $115_{EGR}$ can be utilized with the NEA stream $115_{NEA}$ as a way to avoid having to construct a prohibitively large separator 105 to accommodate the higher volume or surface area needed for such loads. As shown, a portion of either or both of filtered inlet air $115_F$ and the OEA stream $115_{OEA}$ can be routed to a vehicular passenger compartment or cabin as a way to refresh or otherwise augment the cabin air quality. In one form, the inlet air $115_I$ may be pressurized, such as by a turbocharger 135 or other related device. The turbocharger 135 may be driven by excess exhaust gas that is not directed back into the intake control 125.

The EGR stream $115_{EGR}$ works by recirculating a portion of the exhaust gas back to the turbocharged intake air coming from one or the other of NEA stream $115_{NEA}$ and OEA stream $115_{OEA}$. This has the effect of diluting the $O_2$ being introduced into the combustion chamber 30, which in turn reduces peak in-cylinder temperatures by providing inert gases like $N_2$ and $H_2O$ that with their relatively high specific heat are effective absorbing the heat that is generated during the combustion process.

Instructions for operation of the inlet air management system 100 come from the controller 130 that may be embodied in one or more electronic control units (ECUs). Controller 130 is used to receive data from sensors S and provide logic-based instructions to the various parts of the inlet air management system 100. As will be appreciated by those skilled in the art, controller 130 may be a singular unit, or one of a distributed set of units throughout the vehicle 2. In one configuration, controller 130 may be configured to have a more discrete set of operational capabilities associated with a smaller number of component functions such as those associated solely with the operation of the inlet air management system 100, while in anther configuration, controller 130 may have a more comprehensive capability such that it acts to control a larger number of components, such as the engine 1, either in conjunction with or separately from the inlet air management system 100, and that all such variants, regardless of the construction and range of functions performed by the controller 130, are deemed to be within the scope of the present disclosure. In one form associated with only performing functions associated with the inlet air management system 100, the controller 130 may be configured as an application-specific integrated circuit (ASIC). In one form, controller 130 is provided with one or more input/output (I/O) 130A, microprocessor or central processing unit (CPU) 130B, read-only memory (ROM) 130C, random-access memory (RAM) 130D, which are respectively connected by a bus 1301 to provide connectivity for a logic circuit for the receipt of signal-based data, as well as the sending of commands or related instructions. Various algorithms and related control logic may be stored in the ROM 130C or RAM 130D in manners known to those skilled in the art. Such control logic may be embodied in a preprogrammed algorithm or related program code that can be operated on by controller 130 and then conveyed via I/O 130A to the inlet air management system 100 as discussed herein. In one form of I/O 130A, signals from the various sensors S are exchanged with controller 130.

In situations where the controller 130 is configured to provide control to more than just the inlet air management system 100 (for example, to the operation of one or more of the engine 1, supply of fuel or other systems within vehicle 2), other such signals from additional sensors S may also be signally provided to controller 130 for suitable processing by the control logic contained therein, including those where combustion data from the engine 1 is provided for control over the mixing or related delivery of combustor inlet gas $115_C$ that is delivered from the intake control 125. For example, in a manner consistent with GCI modes of engine 1 operation, controller 130 may be programmed with a fuel injector driver 130E, an EGR driver 130F, engine valve control 130G and flow valve control 130H (for any valves disposed in the flow conduit 115) to provide a multiple late-injection, stratified-mixture, low-temperature combustion process as a way to promote smooth operation and low NOx emissions of engine 1 over a substantial entirety of its load-speed range. Such control is particularly beneficial for the multiple late-injection strategy used for the delivery of fuel in the GCI engine 1 as such delivery is optimized when it coincides with various sequences in the compression stroke that can be measured by sensors S that detect crank angle degree (CAD) from the crankshaft 15 to help control when auto-ignition occurs. Within the present context, the position of the piston 60 within the cylinder 10 is typically described with reference to CAD before or after the top dead center (TDC) position of piston 60. The controller 130 may also base such delivery strategies on other engine 1 operating parameters such as load and engine speed, as well as the number of times such injection is contemplated. For example, CAD from 0° to 180° corresponds to the power stroke, with 0° representing TDC and 180° representing bottom dead center (BDC). Likewise, CAD from 180° to 360° represents an exhaust stroke with the latter representing TDC. Moreover, CAD from 360° to 540° represents an intake stroke with BDC at the latter. Furthermore, CAD from 540° to 720° represents a compression stroke with TDC at the latter. By way of example, the controller 130—when used in a 6-cylinder engine—would have ignition taking place every 120° of crankshaft 15 rotation, that is to say three ignitions per every revolution of engine 1. Thus, when ignition has taken place each of the six cylinders one time, the crankshaft 15 has rotated twice to traverse 720° of rotary movement. Likewise, if engine 1 were configured as a 4-cylinder engine, the ignition would take place every 180° of crankshaft 15 rotation. In one form, one of the sensors S may be a crank sensor to monitor the position or rotational speed of the crankshaft 15. The data acquired from such a crank sensor is routed to the controller 130 for processing in order to determine fuel injection timing and other engine 1 parameters, including ignition timing for those circumstances (such as cold startup, and the ensuing warm-up) where spark ignition device 120 is being used. Sensors S such as the crank sensor may be used in combination with other sensors S (such as those associated with valve 20 position) to monitor the relationship between the valves 20 and pistons 60 in engine 1 configurations with variable valve timing.

The controller 130 may be implemented using model predictive control schemes such as the supervisory model predictive control (SMPC) scheme or its variants, or such as multiple-input and multiple-output (MIMO) protocols, where inputs include numerous values associated with the various post-combustion exhaust gas treatment components discussed herein, sensors S (such as exhaust gas temperature sensor, $O_2$ sensor, NOx sensor, SOx sensor or the like), estimated values (such as from the lookup tables or calculated algorithmically) or the like. In that way, an output voltage associated with the one or more sensed values from sensors S is received by the controller 130 and then digitized and compared to a predetermined table, map, matrix or algorithmic value so that based on the differences, outputs indicative of a certain operational condition are generated. These outputs can be used for adjustment in the various components within the purview of the controller 130, such as the remaining components associated with inlet air management system 100.

As mentioned above, in one form, controller 130 may be preloaded with various parameters (such as atmospheric pressure, ambient air temperature and flow rate, exhaust gas temperature and flow rate, engine MEP or the like) into a lookup table that can be included in ROM 130C or RAM 130D. In another form, controller 130 may include one or more equation- or formula-based algorithms that permit the CPU to generate a suitable logic-based control signal based on inputs from various sensors, while in yet another form, controller 130 may include both lookup table and algorithm features to promote its monitoring and control functions. Regardless of which of these forms of data and computation interaction are employed, the controller 130—along with the associated sensors S, membrane separator 105, EGR 110 and associated flow control conduit 115—cooperate such that as an operating load on the engine 1 increases beyond a cold start or warm-up condition, more of the NEA stream $115_{NEA}$ is delivered to the intake control 125 from the separator 105 than from the EGR 110.

Figure 3:
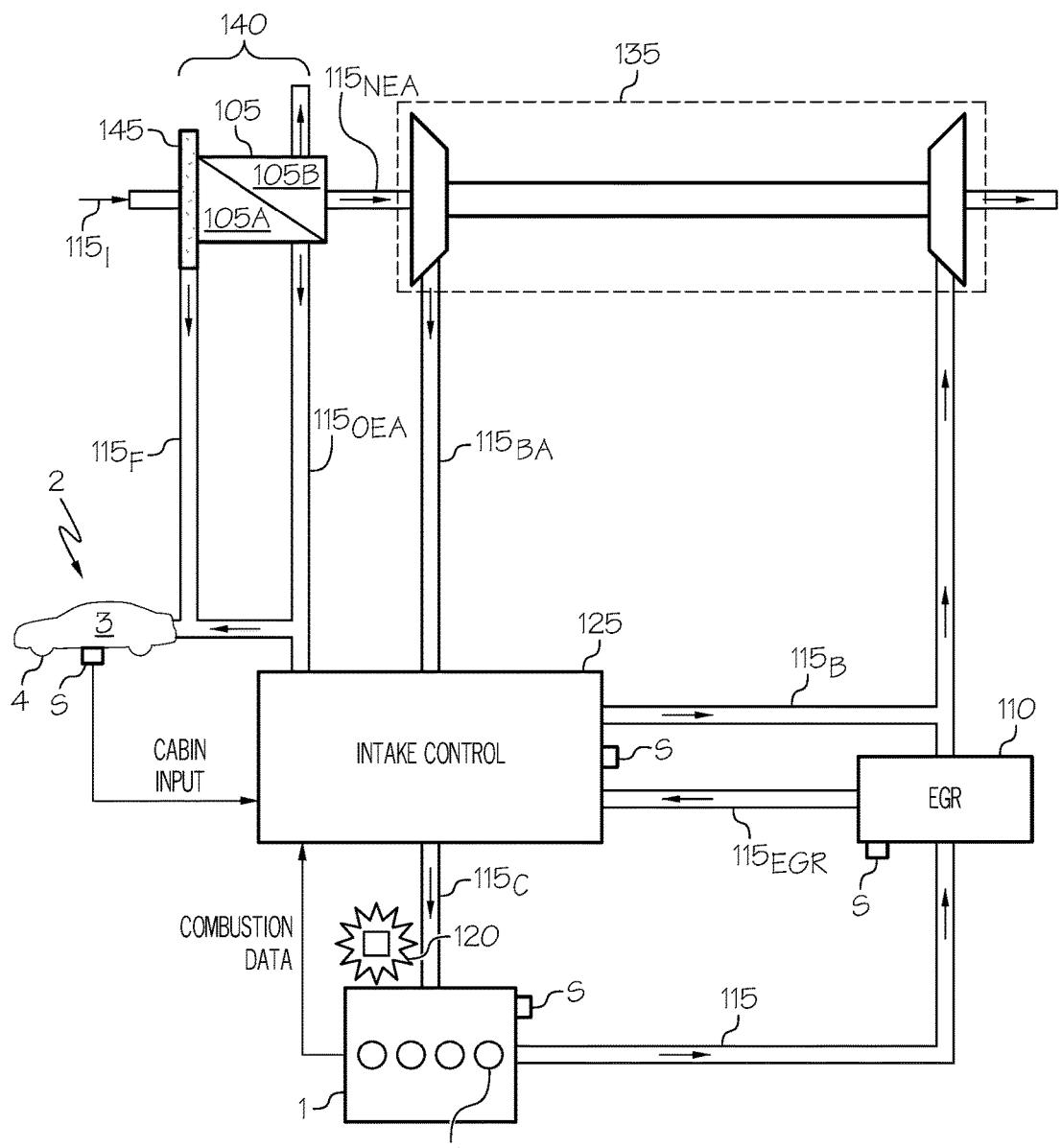
FIG. 3 illustrates a variation of the air management system of FIG. 2 where a membrane module is coupled with an air filter for a line-replaceable unit in accordance with one or more embodiments shown or described herein.

Referring next to FIG. 3, in one form, the separator 105 may be formed as part of a module 140 in order to have line-replaceable unit (LRU) qualities. In this way, maintenance operations associated with replacement or service of the separator 105 or air filter 145 may be simplified. Such LRUs may be readily stocked for so-called off-the-shelf replacement from readily-available on-site inventories. Because of their modularity, LRUs also can contribute reducing system costs and increase quality, by centralizing development across different models of vehicle 2. For lower maintenance cost of the vehicle 2, the separator 105 may be placed with the air filter 145 in such a way that the module 140 forms a combined housing, while in another form, the separator 105 may be formed in its own housing.

MEP—including its variants indicated mean effective pressure (IMEP), brake mean effective pressure (BMEP) or friction mean effective pressure (FMEP)—provides a value of the ability of a particular engine 1 to do work without regard to the number of cylinders 10 or related engine 1 displacement. Moreover, it provides a measure of the pressure corresponding to the torque produced so that it may be thought of as the average pressure acting on a piston 60 during the different portions of its four cycles (inlet, compression, ignition and exhaust). In fact, MEP is a better parameter than torque to compare engines for design and output because of its independence from engine speed or size. As such, MEP provides a better indicator than other metrics (such as horsepower) for engines in that the torque produced is a function of MEP and displacement only, while horsepower is a function of torque and rpm. Thus, for a given displacement, a higher maximum MEP means that more torque is being generated, while for a given torque, a higher maximum MEP means that it is being achieved from a smaller engine 1. Likewise, higher maximum MEP may be correlated to higher stresses and temperatures in the engine 1 which in turn provide an indication of either engine 1 life or the degree of additional structural reinforcement in engine 1. Significantly, extensive dynamometer testing, coupled with suitable analytical predictions, permit MEP to be well-known for modern engine designs. As such, for a CI engine, MEP values of about 7.0 bar to about 9.0 bar are typical at engine speeds that correspond to maximum torque (around 3000 rpm), while for naturally aspirated (that is to say, non-turbocharged) SI engines, MEP values of about 8.5 bar to about 10.5 bar are common, while for turbocharged SI engines, the MEP might be between about 12.5 bar and about 17.0 bar.

Likewise, MEP values may be determined for various operating regimes for engine 1. Such operating regimes may include low power or load (including, for example, engine idling conditions) that is one form corresponds to a MEP of up to about 1.0 bar, in another form of an MEP of up to about 2.0 bar. Likewise, such operating regimes may include normal (or medium) power or load that is one form corresponds to a MEP of between about 2.0 bar to about 5.0 bar, in another form of an MEP of between about 2.0 bar and about 6.0 bar, in another form of an MEP of between about 2.0 bar and about 7.0 bar. Moreover, such operating regimes may include a high power or load that is one form corresponds to a MEP of about 7.0 bar and above, in another form of an MEP of about 8.0 bar and above, in another form of an MEP of about 9.0 bar and above, and in another form of an MEP of about 10.0 bar and above.

As will be understood, these and other MEP values may be input into a suitably-mapped set of parameters that may be stored in a memory accessible location (such as the lookup tables mentioned above) so that these values may be used to adjust various engine 1 operating parameters, as well as for the controller 130 when acting in its diagnostic capacity. In such case, it may work in conjunction with some of the sensors S, including those that can be used to measure cylinder 10 volume (such as through crankshaft 15 angle or the like).

Figure 4:
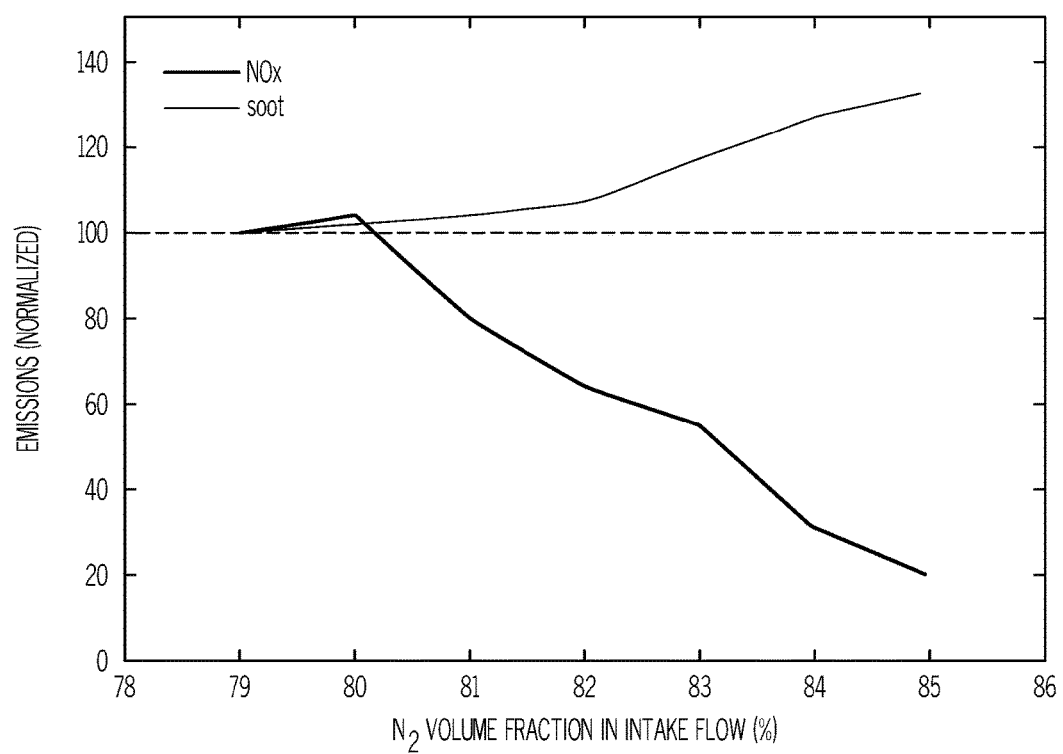
FIG. 4 illustrates a normalized comparison of NOx and soot emission with varying nitrogen enrichment using the air management system in accordance with one or more embodiments shown or described herein.
Figure 5:
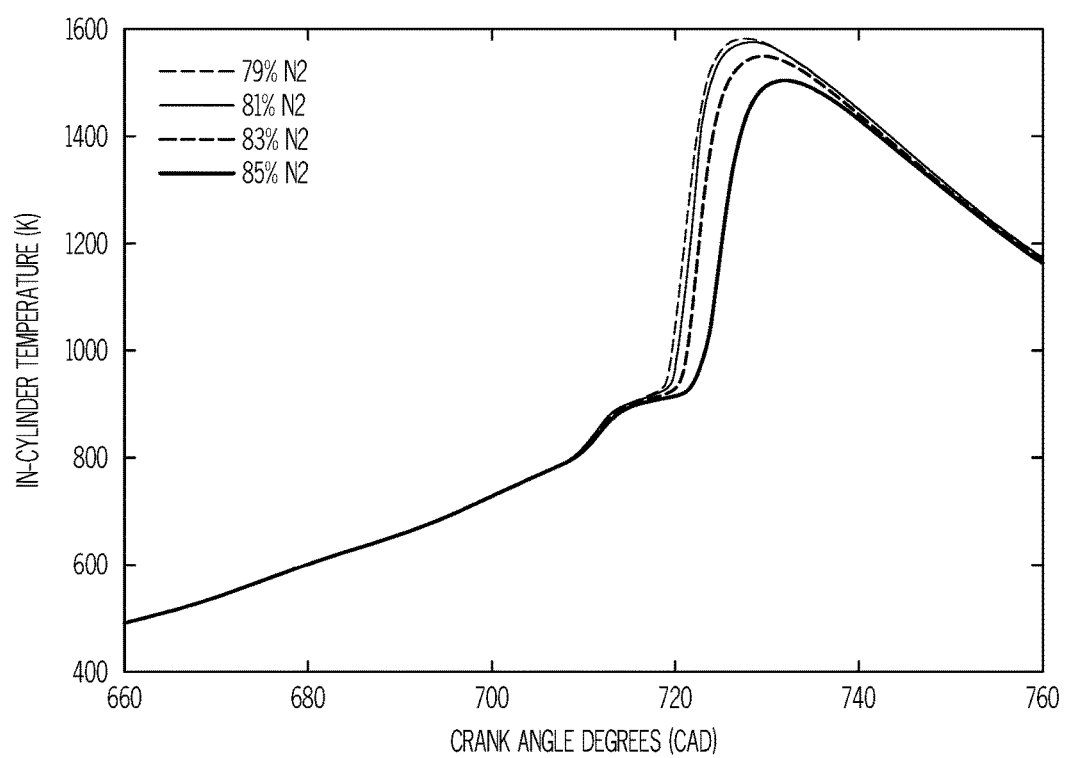
FIG. 5 illustrates an exemplary in-cylinder temperature trace during a notional GCI engine combustion process.

Referring next to FIGS. 4 and 5, both analytical and experimental studies confirm that using the NEA stream $115_{NEA}$ and the EGR stream $115_{EGR}$ can dilute the intake charge to decrease GCI combustion rate, and as a result reduce NOx emission. Because the NEA stream $115_{NEA}$ is used over a substantial entirety of the loads that engine 1 is expected to be exposed to, it is beneficial to understand the construction of the separator 105. In particular, separator 105 can be adjusted such that $O_2$ penetrates the membrane several times faster than $N_2$, which impacts the amount of OEA stream $115_{OEA}$ being produced on the permeate side 105A. Penetration speed can be measured in terms of permeance or permeability of the air that is incoming to separator 105. In the meantime, the NEA stream $115_{NEA}$ is continuously produced in the retentate side 105B. A membrane selectivity or related separation factor is used to compare the separating capacity of a membrane for certain target gases where the selectivity is given by the ratio of their permeability (or permeance). In order to meet the certain requirements of the product air (certain $N_2$ concentration and flow rate of NEA stream $115_{NEA}$), the required amount of feed air (that is, feed flow rate), as well as the feed/permeate pressure, can be varied. In addition, the purity of $O_2$ in the permeate side 105A stream may also be varied. Likewise, the configuration of the separator 105 may be varied. For example, the separator 105 may be configured as a spiral-wound module, a plate-and-frame module, a hollow fiber membrane module, a hollow fiber module or a capillary module. For instance, in a hollow fiber membrane module, the feed can be introduced inside of the fiber (called 'inside-out') or outside of the fiber (called 'outside-in'). As shown in Table 1 for a hollow fiber membrane module, the highly $O_2$ selective membrane (material B, with an $O_2/N_2$ selectivity of 5) is shown to be more effective as the separator 105 than the less $O_2$ selective membrane (material A, with an $O_2/N_2$ selectivity of 2) in minimizing the amount of intake air flow required in order to achieve the same $N_2$ concentration in the NEA stream. Such selectivity (as well as configuration) can thus form a basis for sizing the separator 105 for a given engine 1.

TABLE 1

Production of NEA using hollow fiber membrane module.

| Membrane material | Feed configuration | Feed | | Permeate | | Retentate | |
|---|---|---|---|---|---|---|---|
| | | Flow rate, L/min | $N_2$ concentration, vol. % | Flow rate, L/min | $O_2$ concentration, vol. % | Flow rate, L/min | $N_2$ concentration, vol. % |
| A | Inside-out | 90 | 79 | 40 | 28.5 | 50 | 85 |
| B | Inside-out | 66 | | 16 | 39.8 | | |
| B | Outside-in | 68 | | 18 | 37.0 | | |

Feed pressure: 3 bar;
Permeate pressure: 1.1 bar

As part of the analysis conducted by the authors of the present disclosure, computational fluid dynamics (CFD) were used to simulate the performance and emissions of GCI engine 1 operating in a nitrogen enhanced mode of operation. In such simulation, a single cylinder 4 valve engine with a 14.5:1 geometric compression ratio was analyzed. The combustion chamber received 14 milligrams of light naphtha fuel injected during a single cycle run, where the load was specified at 5 bar MEP at 1500 rpm with 1.1 bar boosted intake pressure. These results are shown where in general, increasing the amount of NOx-suppressing fluid from the EGR stream $115_{EGR}$ is beneficial at idle or related low engine 1 load conditions, but less so at MEPs associated with medium and high loads. For example, EGR 110 should not be used at loads higher than about 7.0 bar BMEP, as at these higher load conditions, the resulting exhaust gas emissions can contain an excessive amount of smoke. By monitoring engine 1 load and determining that such load is less than a threshold (such as that associated with a defined low load range), appropriate operation of the EGR 110 can be achieved. Moreover, the controller 130 may be used to instruct how much of the $N_2$ enrichment being provided to the intake control 125 comes from each of the EGR stream $115_{EGR}$ and the NEA stream $115_{NEA}$ based on factors such as this.

Referring with particularity to FIG. 4, experiments were conducted on engine 1 as discussed in the previous paragraph as a way to verify the feasibility of $N_2$ enrichment by using separator 105. Various parameters were varied, including those associated with feed and permeate flow rate and operating pressure (feed pressure) on the $N_2$ purity and flow rate. The NOx emission was normalized to the reference value with a standard atmospheric concentration of 79% (by volume) of $N_2$. Thus, a relatively modest 6% increase in $N_2$ to 85% results in about an 80% suppression of the NOx emission relative to the non-enriched reference case, although soot production does increase by about 25 to 30 percent.

Referring with particularity to FIG. 5, an in-cylinder temperature trace is shown for a simulated combustion process for the GCI engine 1. In this regard, the chart represents a rate of heat release versus CAD. The peak in-cylinder temperature decreases with an increasing $N_2$ composition in the inlet air charge. The NEA stream $115_{NEA}$ dilutes the intake charge and decreases GCI engine 1 combustion rate, as a result, reducing peak in-cylinder temperature of the engine 1. It is known that NOx emission is produced at high temperature. As such, lowering the in-cylinder temperature results in a dramatically reduced NOx emission. Significantly, the temperature reduction associated the NOx reduction permits changes in where during the compression process the injection of fuel takes place. As such, the injection of fuel at a particular CAD to keep such combustion temperatures low depends on various factors associated with a desired multiple late-injection, stratified-mixture, low-temperature combustion process. Such factors may include fuel-to-air ratios, EGR levels, inlet air temperature and pressure or the like. With the GCI engine 1, the fuel may be injected at different times during on the compression stroke (for example, between about 120° to 90° CAD before TDC in some circumstances, and between about 30° to 10° before TDC in others); the controller 130 may take into consideration differences in the fuel's auto-ignition properties under these various temperature and pressure regimes within the combustion chamber 30 to instruct such injection, as well as NEA or OEA steams $115_{NEA}$, $115_{OEA}$, valve lift timing or the like.

By injecting the fuel at a particular CAD, emissions in general, and NOx in particular, may be reduced while still preserving stable, efficient operation. With particular regard to high engine 1 loads (where the MEP is high), it may be difficult to inject all of the fuel at the desired CAD due to the high rotational speed. It is in situations like this where the use of the inlet air management system 100 and its blended reliance on NEA stream $115_{NEA}$ and EGR stream $115_{EGR}$ coming from the respective separator 105 and an EGR 110 is most useful. In particular, controller 130 can be used in conjunction with the other components discussed herein to provide an appropriate inlet charge to intake control 125 in order to promote auto-ignition combustion to within a preferred CAD. In fact, depending on the engine 1 load and various input parameters, much (if not all) of the auto-ignition can be made to take place in a narrow CAD after TDC, as shown in the figure. Likewise, the duration of the combustion event can be controlled to achieve desirable peak cylinder temperature and pressure levels that are consistent with NOx reduction. In a similar way, increasing the OEA stream $115_{OEA}$ may be used in certain engine 1 operating conditions to advance the initiation of the combustion process (often in conjunction with the spark ignition device 120.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is noted that terms like "preferably", "generally" and "typically" are not utilized herein to limit the scope of the claims or to imply that certain features are critical, essential, or even important to the structures or functions disclosed herein. Rather, these terms are merely intended to highlight alternative or additional features that may or may not be utilized in a particular embodiment of the disclosed subject matter. Likewise, it is noted that the terms "substantially" and "approximately" and their variants are utilized herein to represent the inherent degree of uncertainty that may be attributed to any quantitative comparison, value, measurement or other representation. As such, use of these terms represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A gasoline compression ignition (GCI) engine with a nitrogen enriched air supply for exhaust gas emissions reduction, the GCI engine comprising:
   a plurality of combustion chambers each with a piston movably disposed therein;
   at least one fuel injector in selective fluid communication with each of the combustion chambers;
   an air inlet in selective fluid communication with each of the combustion chambers;
   an exhaust gas outlet in selective fluid communication with each of the combustion chambers; and
   an inlet air management system comprising:
      a membrane-based separator in fluid communication with the air inlet such that air introduced to the separator is operated thereupon to be split into at least an oxygen enriched air stream and a nitrogen enriched air stream;
      an exhaust gas recirculation flowpath in fluid communication with the exhaust gas outlet to convey a nitrogen enriched combustion product stream that forms when a mixture of air and a gasoline-based fuel is ignited within the combustion chamber;
      flow control conduit cooperative with the separator and the exhaust gas recirculation flowpath such that the nitrogen enriched combustion product stream from the exhaust gas recirculation flowpath, the nitrogen enriched air stream from the separator, or both, are placed in selective fluid communication with the air inlet;
      a plurality of sensors configured to acquire engine operating parameters; and
      a combustion air enrichment controller in signal communication with the sensors such that (i) during compression of air within each combustion chamber, gasoline-based fuel is selectively introduced in a staged manner to give a mixture of fuel and air that has both locally stoichiometric and globally stratified properties for compression ignition and (ii) the separator, exhaust gas recirculation flowpath, flow control conduit, sensors and controller cooperate to deliver to the air inlet (a) the oxygen enriched air stream from the separator during a cold start and warm-up load on the GCI engine and (b) the nitrogen enriched air stream from the separator and the nitrogen enriched combustion product stream from the exhaust gas recirculation flowpath, wherein during an increase in engine load not associated with the engine cold start and warm-up loads, the controller provides an instruction set where the nitrogen enriched air supply that is used for the exhaust gas emissions reduction is provided at least partially by the nitrogen enriched air stream from the separator and increasingly the nitrogen enriched combustion product stream from the exhaust gas recirculation flowpath.

2. The GCI engine of claim 1, wherein the an inlet air management system is configured such that the nitrogen enriched air supply that is used for the exhaust gas emissions reduction is never exclusively provided by the nitrogen enriched combustion product stream from the exhaust gas recirculation flowpath.

3. The GCI engine of claim 1, wherein when the increase in engine load not associated with the cold start and warm-up load corresponds to an engine mean effective pressure of below about two bar, the nitrogen enriched air supply that is used for the exhaust gas emissions reduction is provided substantially exclusively by the separator.

4. The GCI engine of claim 1, wherein when the increase in engine load not associated with the cold start and warm-up load corresponds to an engine mean effective pressure of between about two bar and about seven bar, the nitrogen enriched air supply that is used for the exhaust gas emissions reduction is provided primarily by the separator.

5. The GCI engine of claim 1, wherein when the increase in engine load not associated with the cold start and warm-up load corresponds to an engine mean effective pressure of greater than about seven bar, the nitrogen enriched air supply that is used for the exhaust gas emissions reduction is provided by both the separator and exhaust gas recirculation flowpath.

6. The GCI engine of claim 1, further comprising a spark igniter disposed within the head for selectively igniting a mixture of air and a gasoline-based fuel that is introduced into the combustion chamber, the spark igniter configured such that the selectively igniting only during the cold start or warm-up loads on the engine.

7. The GCI engine of claim 6, wherein the controller is configured such that no nitrogen enriched air stream is delivered to the air inlet during the cold start or warm-up loads on the engine.

8. The GCI engine of claim 1, wherein the flow control conduit comprises at least one valve disposed therein, the at least one valve configured to be actuated by a control signal from the controller.

9. The GCI engine of claim 1, wherein the separator is disposed within the inlet air management system as a line-replaceable unit.

10. The GCI engine of claim 9, wherein the line-replaceable unit forms a modular assembly that contains the separator and an air filter.

11. The GCI engine of claim 1, further comprising:
an engine block defining a plurality of cylinders each of which define a volumetric space of a respective one of the combustion chambers;
a crankshaft rotatably movable within the block and coupled to the pistons each of which are disposed within a respective one of the cylinders such that upon compression ignition of the mixture, a resulting reciprocating motion of the pistons imparts rotational motion to the crankshaft;
a plurality of cams responsive to movement of the crankshaft;
a head coupled to the engine block to define the plurality of combustion chambers, the head comprising at least one inlet valve and at least one exhaust valve disposed therein such that each of the valves are movably responsive to the crankshaft through a corresponding one of the cams; and
a fuel inlet in selective fluid communication with each of the combustion chambers through the fuel injector.

12. A vehicle comprising:
a platform comprising a wheeled chassis that defines a passenger compartment therein; and
a gasoline compression ignition (GCI) engine coupled to the platform to deliver motive power thereto, the GCI engine comprising:
  a plurality of combustion chambers each with a piston movably disposed therein;
  at least one fuel injector in selective fluid communication with each of the combustion chambers;
  an air inlet in selective fluid communication with each of the combustion chambers;
  an exhaust gas outlet in selective fluid communication with each of the combustion chambers; and
  an inlet air management system comprising:
    a membrane-based separator in fluid communication with the air inlet such that air introduced to the separator is operated thereupon to be split into at least an oxygen enriched air stream and a nitrogen enriched air stream;
    an exhaust gas recirculation flowpath in fluid communication with the exhaust gas outlet to convey a nitrogen enriched combustion product stream that forms when a mixture of air and a gasoline-based fuel is ignited within the combustion chamber;
    flow control conduit cooperative with the separator and the exhaust gas recirculation flowpath such that the nitrogen enriched combustion product stream from the exhaust gas recirculation flowpath, the nitrogen enriched air stream from the separator, or both, are placed in selective fluid communication with the air inlet;
    a plurality of sensors configured to acquire engine operating parameters; and
    a combustion air enrichment controller in signal communication with the sensors such that (i) during compression of air within each combustion chamber, the fuel is selectively introduced in a staged manner to give a mixture of fuel and air that has both locally stoichiometric and globally stratified properties for compression ignition and (ii) the separator, exhaust gas recirculation flowpath, flow control conduit, sensors and controller cooperate to deliver to the air inlet (a) the oxygen enriched air stream from the separator during a cold start and warm-up load on the GCI engine and (b) the nitrogen enriched air stream from the separator and the nitrogen enriched combustion product stream from the exhaust gas recirculation flowpath, wherein during an increase in engine load not associated with the engine cold start and warm-up loads, the controller provides an instruction set where varying portions of the exhaust gas emissions reduction is provided by the nitrogen enriched combustion product stream from the exhaust gas recirculation flowpath and the nitrogen enriched air stream from the separator.

13. The vehicle of claim 12, wherein a portion of the flow control conduit is in selective fluid communication with the passenger compartment to deliver at least a portion of the oxygen enriched air stream is conveyed to the passenger compartment.

14. The vehicle of claim 13, wherein the oxygen enriched air stream is conveyed to the passenger compartment during all engine loads not associated with the engine cold start and warm-up loads.

15. The vehicle of claim 12, wherein the varying portions of the exhaust gas emissions reduction is determined by the controller based on an engine mean effective pressure such that:
  in a first engine mean effective pressure range, the nitrogen enriched air supply that is used for the exhaust gas emissions reduction is provided substantially exclusively by the separator;
  in a second engine mean effective pressure range, the nitrogen enriched air supply that is used for the exhaust gas emissions reduction is provided primarily by the separator; and
  in a third engine mean effective pressure range, the nitrogen enriched air supply that is used for the exhaust gas emissions reduction is provided by both the separator and exhaust gas recirculation flowpath.

16. The vehicle of claim 12, wherein the inlet air management system is further configured such that the oxygen enriched air stream is delivered to the air inlet only during the cold start or warm-up loads on the engine.

17. A method of operating a GCI engine, the method comprising:
introducing a gasoline-based fuel to a plurality of combustion chambers within the GCI engine, wherein each of the combustion chambers are defined at least in part by a cylinder with a piston movably disposed therein; and
providing an inlet air management system comprising:
  a membrane-based separator;
  an exhaust gas recirculation flowpath;
  flow control conduit cooperative with the separator and the exhaust gas recirculation flowpath;
  a plurality of sensors configured to acquire engine operating parameters; and
  a combustion air enrichment controller in signal communication with the sensors and the flow control conduit;
using the inlet air management system to introduce air into a membrane-based separator;
separating the introduced air into at least an oxygen enriched air stream and a nitrogen enriched air stream;
compressing at least a portion of one of the oxygen enriched air stream and the nitrogen enriched air stream within each combustion chamber and selectively introducing the fuel in a staged manner to give a mixture of fuel and air that has both locally stoichiometric and globally stratified properties for compression ignition; and adjusting a combustion rate within the GCI engine by delivering at least a portion of the nitrogen enriched air stream from the separator and a nitrogen enriched combustion product stream from the exhaust gas recirculation flowpath to the plurality of combustion chambers, wherein during an increase in engine load not associated with a cold start or warm-up load, the controller provides an instruction set where the nitrogen enriched air supply that is used for the exhaust gas emissions reduction is provided at least partially by the nitrogen enriched air stream from the separator and increasingly the nitrogen enriched combustion product stream from the exhaust gas recirculation flowpath.

18. The method of claim 17, wherein during an increase in engine load that is associated with a cold start or warm-up load, the controller provides an instruction set where the oxygen enriched air stream from the separator is provided to the plurality of combustion chambers.

19. The method of claim 18, wherein during the increase in engine load that is associated with a cold start or warm-up load, the controller provides an instruction set where no nitrogen enriched air stream is provided to the plurality of combustion chambers.

20. The method of claim 17, wherein the oxygen enriched air stream is supplied by the separator to increase a flame propagation combustion rate within the combustion chamber during at least one of GCI engine cold start and GCI engine warm-up.

21. The method of claim 17, wherein the emissions reduction of an exhaust gas comprises a NOx emission reduction.

22. The method of claim 17, wherein the adjusting a combustion rate within the GCI engine comprises diluting an air intake charge into the combustion chambers.

23. The method of claim 17, wherein the adjusting a combustion rate within the GCI engine comprises speeding up the transient control response of the GCI engine.

* * * * *